US012407100B2

(12) United States Patent
Li et al.

(10) Patent No.: US 12,407,100 B2
(45) Date of Patent: Sep. 2, 2025

(54) METAL STRUCTURE FOR STEERING AND BROADENING MMWAVE ANTENNA COVERAGE

(71) Applicant: Google LLC, Mountain View, CA (US)

(72) Inventors: Pei Li, Milpitas, CA (US); Ming Zheng, Santa Clara, CA (US); Vijay L. Asrani, San Jose, CA (US)

(73) Assignee: Google LLC, Mountain View, CA (US)

( * ) Notice: Subject to any disclaimer, the term of this patent is extended or adjusted under 35 U.S.C. 154(b) by 145 days.

(21) Appl. No.: 18/247,510

(22) PCT Filed: Sep. 1, 2021

(86) PCT No.: PCT/US2021/048692
§ 371 (c)(1),
(2) Date: Mar. 31, 2023

(87) PCT Pub. No.: WO2022/072112
PCT Pub. Date: Apr. 7, 2022

(65) Prior Publication Data

US 2023/0378643 A1 Nov. 23, 2023

Related U.S. Application Data

(60) Provisional application No. 63/086,501, filed on Oct. 1, 2020.

(51) Int. Cl.
*H01Q 1/24* (2006.01)
*H01Q 3/34* (2006.01)
(Continued)

(52) U.S. Cl.
CPC ............... *H01Q 3/34* (2013.01); *H01Q 1/243* (2013.01); *H01Q 3/44* (2013.01); *H01Q 19/28* (2013.01)

(58) Field of Classification Search
CPC H01Q 3/34; H01Q 1/243; H01Q 3/44; H01Q 19/28
See application file for complete search history.

(56) References Cited

U.S. PATENT DOCUMENTS 7,164,387 B2 * 1/2007 Sievenpiper ............. H01Q 9/14 343/866
7,742,002 B2 * 6/2010 Cheng .................... H01Q 1/243 343/702
(Continued)

FOREIGN PATENT DOCUMENTS

EP 1814195 8/2007
WO 2022072112 4/2022

OTHER PUBLICATIONS

"International Search Report and Written Opinion", Application No. PCT/US2021/048692, Dec. 9, 2021, 13 pages.
(Continued)

*Primary Examiner* — David E Lotter
(74) *Attorney, Agent, or Firm* — Colby Nipper PLLC

(57) ABSTRACT

Techniques and apparatuses are described that implement a metal structure for steering and broadening millimeter-wave (mmWave) antenna coverage. A user device includes at least one mmWave antenna that produces a near-field radiation region and a far-field radiation pattern. Disposed within the near-field radiation region is the metal structure comprising one or more metal pieces. The metal pieces are able to reflect energy associated with the far-field radiation pattern or produce another far-field radiation pattern based on currents induced in the metal pieces by the near-field radiation region in such a way that the far-field radiation pattern from the mmWave antenna is positively affected (e.g., steered and/or broadened). In this way, the far-field radiation pattern can be effectively steered and/or broadened with a simple cost and space-effective design.

20 Claims, 10 Drawing Sheets

(51) Int. Cl.
*H01Q 3/44* (2006.01)
*H01Q 19/28* (2006.01)

(56) References Cited

U.S. PATENT DOCUMENTS

| | | | | |
|---|---|---|---|---|
| 2017/0201014 | A1 | 7/2017 | Lee et al. | |
| 2017/0309991 | A1 * | 10/2017 | Noori | H01Q 1/2258 |
| 2018/0233808 | A1 * | 8/2018 | Noori | H01Q 1/241 |
| 2024/0006754 | A1 * | 1/2024 | Kono | H01Q 1/44 |

OTHER PUBLICATIONS

"International Preliminary Report on Patentability", Application No. PCT/US2021/048692, Mar. 28, 2023, 10 pages.
"Foreign Office Action", IN Application No. 202347007822, Oct. 3, 2023, 6 pages.
"Foreign Office Action", EP Application No. 21790648.6, Apr. 22, 2025, 12 pages.
FLOC'H, et al., "Design of Printed Dipole with Reflector and Multi Directors", Nov. 2009, 4 pages.

* cited by examiner

METAL STRUCTURE FOR STEERING AND BROADENING MMWAVE ANTENNA COVERAGE

RELATED APPLICATION(S)

This application is a national stage entry of International Application No. PCT/US2021/048692, filed Sep. 1, 2021, which claims the benefit of U.S. Provisional Application No. 63/086,501, filed Oct. 1, 2020, the disclosures of which are incorporated herein by reference in their entirety.

BACKGROUND

Antennas transmit and receive radio-frequency (RF) signals to communicate information. These RF signals enable users to talk with friends, download or upload information, share pictures, remotely control household devices, as well as to interact with a computing device using non-contact gestures. Modern computing devices utilize millimeter wave (mmWave) RF signals (e.g., signals with frequencies greater than or equal to 24 gigahertz) because they are able to communicate at fast speeds and also because they are well adapted for non-contact radar gesture recognition. These mmWave RF signals, however, are limited to shorter propagation distances and are more susceptible to interference when compared with lower frequency RF signals.

In order to mitigate these potential drawbacks, phased antenna arrays are often utilized to steer, or otherwise manipulate, mmWave radiation patterns (e.g., via beamforming). Due to space constraints on the devices in which they are implemented, phased antenna arrays are often one-dimensional (e.g., antennas are arranged in a linear fashion) and, thus, only able to manipulate the radiation patterns in a single plane. While other antennas or other phased antenna arrays can be implemented in other locations on the device to effectively steer the radiation patterns in other planes (e.g., via collective beamforming), such designs add complexity and cost to the devices. Consequently, it can be impractical for some electronic devices that are either cost-sensitive or place a premium on small size to implement a plurality of phased antenna arrays. Further, even if two or more phased antenna arrays can be provided within an electronic device, the need to provide space within the device to accommodate the antenna arrays may be at the expense of form factor or operation of other components of the device (e.g., reduced battery capacity).

SUMMARY

Techniques and apparatuses are described that implement a metal structure for steering and/or broadening mmWave antenna coverage (e.g., steering a direction of maximum radiation and/or broadening an angular range of radiation energy above a certain threshold). An apparatus includes at least one mmWave antenna that produces a near-field and a far-field radiation pattern. Disposed within the near-field radiation region is a metal structure comprising one or more metal pieces. The metal pieces are able to reflect energy associated with the far-field radiation pattern and/or produce another far-field radiation pattern based on currents induced in the metal pieces by the near-field radiation region. The effect of the reflection of energy by the metal piece(s) and/or the generation of the another far-field radiation pattern is to produce a combined mmWave far-field radiation pattern that differs from the far-field pattern that would be generated by the mmWave antenna in the absence of the metal piece(s).

This makes it possible for the far-field radiation pattern from the mmWave antenna to be altered in a desired way (e.g., steered and/or broadened) compared to the far-field radiation pattern generated by the mmWave antenna in the absence of the metal pieces. In this way, the far-field radiation pattern can be effectively steered and/or broadened with a simple cost and space-effective design.

Aspects described below include an apparatus comprising a housing and at least one millimeter-wave antenna configured to generate a near-field radiation region. The apparatus also comprises a metal structure that is made of one or more metal pieces. The metal structure is disposed between the millimeter-wave antenna and the housing and within the near-field radiation region.

Aspects described below also include a method implemented by a computing device, the method comprising transmitting a millimeter-wave signal using at least one millimeter-wave antenna, the transmitting of the millimeter-wave signal forming a near-field radiation region and a far-field radiation pattern. The method further comprises redirecting, via a metal structure that comprises one or more metal pieces and based on the near-field radiation region, at least a portion of energy associated with the far-field radiation pattern, the metal structure disposed between the millimeter-wave antenna and a housing, the metal structure disposed within the near-field radiation region. The method then causes, based on the redirecting, the far-field radiation pattern to have a first range of angles and a first direction of maximum energy. At least one of the first range of angles or a first direction of maximum energy is different to a range of the angles or direction of maximum energy that the far-field pattern would have in the absence of the metal structure.

Aspects described below also include a method implemented by a computing device, the method comprising determining that a far-field radiation pattern of a mmWave antenna of the computing device can be improved. The method further comprises determining a configuration of a plurality of switches of a metal structure of the computing device that is disposed between the mmWave antenna of the computing device and a housing of the computing device and configuring the switches based on the determined configuration effective to adjust the far-field radiation pattern of the mmWave antenna.

Aspects described below also include a system with means for steering and broadening mmWave antenna coverage.

BRIEF DESCRIPTION OF THE DRAWINGS

Apparatuses for and techniques implementing a metal structure for steering and broadening mmWave antenna coverage are described with reference to the following drawings. The same numbers are used throughout the drawings to reference like features and components.

DETAILED DESCRIPTION

Overview

Achieving optimal far-field radiation patterns from mmWave antennas can be challenging. For example, while mmWave antennas are able to send and receive large amounts of data and/or sense non-contact gestures, far-field radiation patterns emitted by mmWave antennas are often limited in breadth (e.g., angular coverage) and range. Although beamforming may be used to increase signal coverage via multiple antennas or multiple antenna arrays in different areas of a device, such approaches are often spatially and cost prohibitive.

To address this issue, techniques and apparatuses are described that implement a metal structure for steering and broadening mmWave antenna coverage. In order to steer and/or broaden a far-field radiation pattern of a mmWave antenna, a metal structure comprising one or more metal pieces is disposed within a near-field radiation region of the mmWave antenna. The metal pieces reflect energy associated with the far-field radiation pattern and/or produce another far-field radiation pattern based on currents induced in the metal structure by the near-field radiation in such a way that the resultant combined mmWave far-field radiation pattern is positively affected (e.g., steered and/or broadened) compared to the far-field radiation pattern provided by the mmWave antenna in the absence of the metal pieces. Positively affected generally means that the resultant combined mmWave far-field radiation differs from the far-field radiation pattern produced by the mmWave antenna in the absence of the metal structure in a desired way. For example, the combined far-field radiation pattern may cover a broader range of angles than the far-field radiation pattern of the mmWave antenna and/or may have a direction of maximum energy that is different than that of the pattern of the mmWave antenna far-field radiation pattern. The described techniques and apparatuses achieve the steering and broadening of the mmWave far-field radiation pattern without using other antennas or antenna arrays (although the techniques and apparatus described herein can be utilized in conjunction with beamforming to further improve the far-field radiation pattern). In this way, the far-field radiation pattern can be effectively steered and/or broadened with a simple cost and space-effective design.

Example Environment

Figure 1:
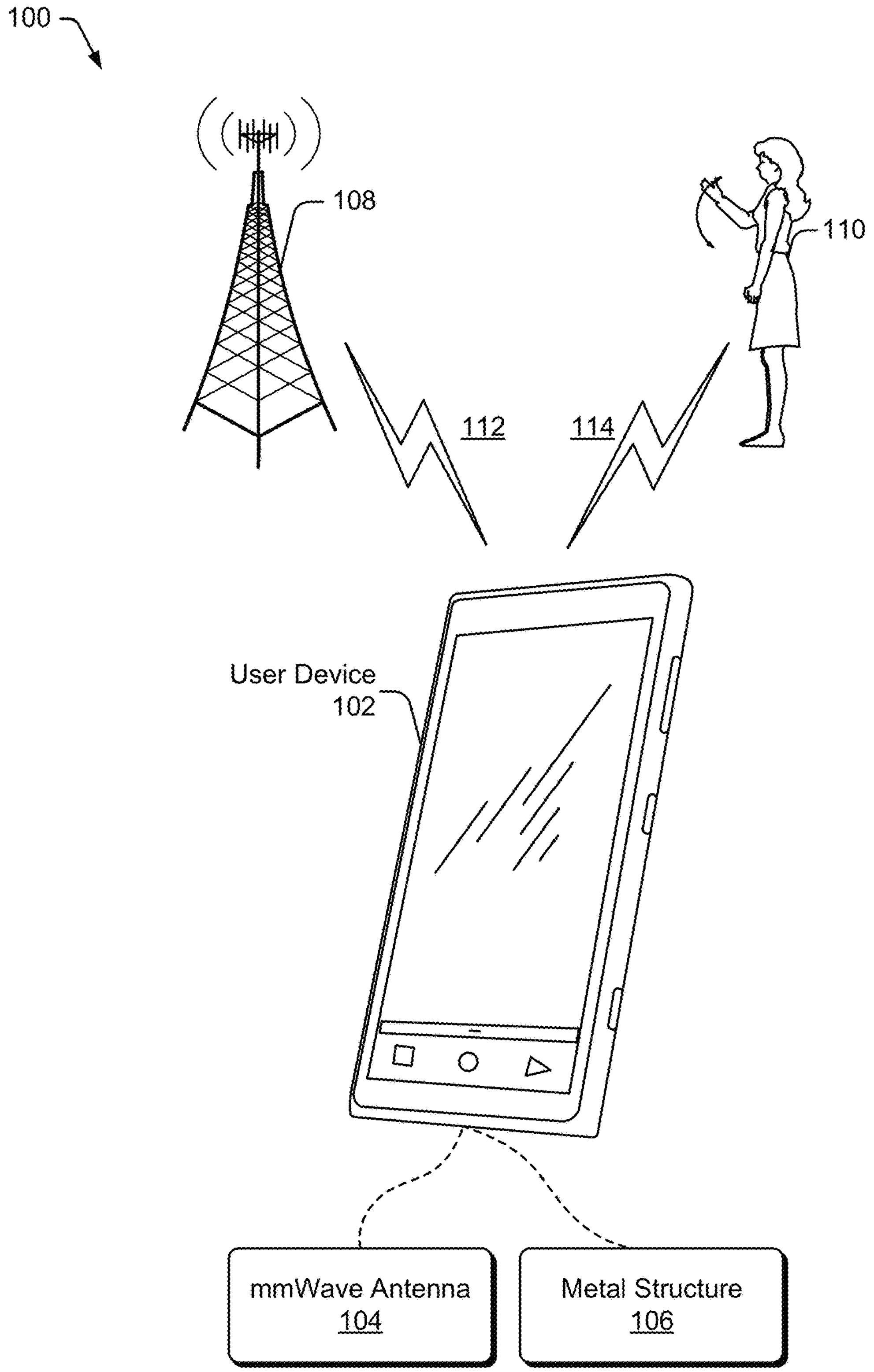
FIG. 1 illustrates an example environment in which a metal structure for steering and broadening mmWave antenna coverage can be implemented.

FIG. 1 is an illustration of an example environment 100 in which techniques using, and an apparatus including, a metal structure for steering and broadening mmWave antenna coverage can be embodied. In the environment 100, a user device 102 includes at least one mmWave antenna 104 and at least one metal structure 106. The mmWave antenna 104 can comprise an antenna array (e.g., a one or two-dimensional array of antennas). However implemented, the mmWave antenna 104 generates near-field and far-field radiation patterns of mmWave signals.

The metal structure 106 is disposed within the near-field radiation region of the mmWave antenna 104 and is configured to beneficially affect the far-field radiation pattern of the mmWave antenna 104. In order to do so, the metal structure 106 can reflect a portion of energy of the mmWave radiation in the near-field radiation region, which affects the far-field radiation pattern. Alternatively or additionally, the metal structure 106 can produce another far-field radiation pattern when a current is induced within the metal structure 106 by the mmWave radiation in the near-field radiation region. By either or both mechanisms, the metal structure 106 steers and/or broadens the far-field radiation pattern of the user device 102. Although the user device 102 is shown to be a smart phone in FIG. 1, the user device 102 can alternatively be implemented as any suitable computing or electronic device, as further described with respect to FIG. 2.

In the environment 100, the user device 102 is a user equipment (UE) that uses the mmWave antenna 104 to communicate with a base station 108 via a wireless link 112 or to detect gestures made by a user 110 via transmission/reflection signals 114. The mmWave antenna 104 is configured to transmit and/or receive RF signals (e.g., wireless link 112 and/or transmission/reflection signals 114) with frequencies at or above 24 GHz (e.g., in a mmWave frequency band. In some implementations, the transmission/reflection signals 114 can comprise RF signals with frequencies of approximately 60 GHz. The techniques and apparatuses described herein, however, can be applied to different frequency bands without departing from the scope of this disclosure (as long as the bands are spaced apart). Any suitable communication protocols or standards can be used to implement the wireless link 112. For example, the wireless link 112 can represent a Fifth-Generation New Radio (5G NR) link. The transmission/reflection signals 114 can represent radio detection and ranging (RADAR) signals. Using the radar signals, the user device 102 can support a variety of radar-based applications, including presence detection (e.g., detecting the presence of the user 110 near the user device 102), gesture recognition, collision avoidance, and human vital-sign detection. The user device 102 is further described with respect to FIG. 2.

Figure 2:
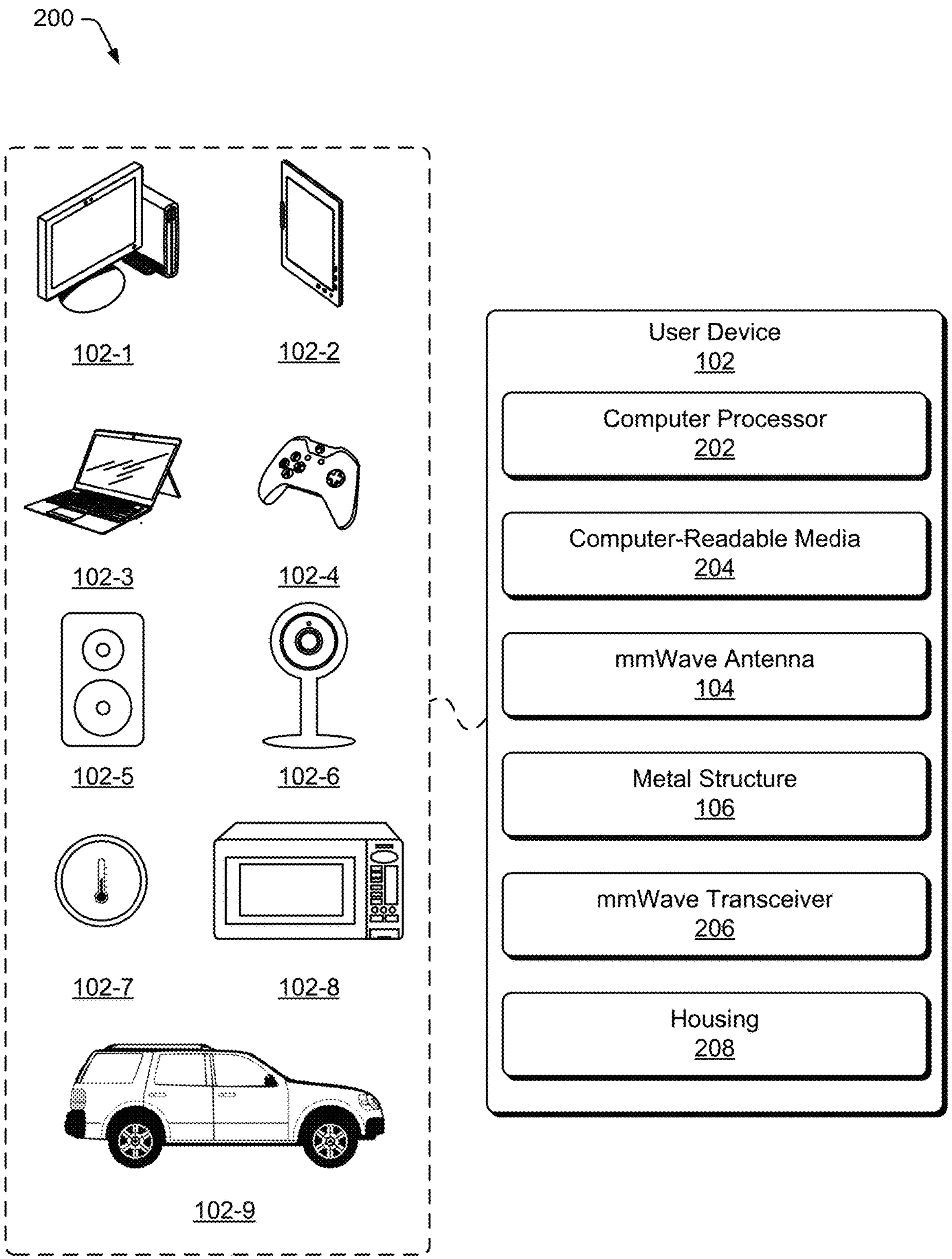
FIG. 2 illustrates an example user device in which a metal structure for steering and broadening mmWave antenna coverage can be implemented.

FIG. 2 illustrates, at 200, the metal structure 106 as part of the user device 102. The user device 102 can be any suitable computing device or electronic device, such as a desktop computer 102-1, a tablet 102-2, a laptop 102-3, a gaming system 102-4, a smart speaker 102-5, a security camera 102-6, a smart thermostat 102-7, a microwave 102-8, or a vehicle 102-9. Other devices can also be used, such as home-service devices, radar systems, baby monitors, routers, computing watches, computing glasses, televisions, drones, charging devices, Internet of Things (IoT) devices, Advanced Driver Assistance Systems (ADAS), point-of-sale (POS) transaction systems, health monitoring devices, track pads, drawing pads, netbooks, e-readers, home-automation and control systems, and other home appliances. The user device 102 can be wearable, non-wearable but mobile, or relatively immobile (e.g., desktops and appliances).

The user device 102 includes at least one computer processor 202 and computer-readable media 204, which includes memory media and storage media. Applications and/or an operating system (not shown) embodied as computer-readable instructions on the computer-readable media 204 can be executed by the computer processor 202. The computer-readable instructions can store instructions to enable wireless communications with the base station 108 or radar sensing (e.g., gesture recognition, presence detection, collision avoidance, or human vital-sign detection), as described with respect to FIG. 1. The user device 102 can also include a display (not shown).

The user device 102 includes the mmWave antenna 104 and at least one mmWave transceiver 206 to transmit and receive mmWave radio-frequency signals via the mmWave antenna 104. The mmWave transceiver 206 includes circuitry and logic for generating and processing the mmWave radio-frequency signals. Components of the mmWave transceiver 206 can include amplifiers, mixers, switches, analog-to-digital converters, filters, and so forth for conditioning the radio-frequency signals. The mmWave transceiver 206 also includes logic to perform in-phase/quadrature (I/Q) operations, such as modulation or demodulation. Together, the mmWave transceiver 206 and the mmWave antenna 104 can transmit or receive signals with frequencies at or above 24 gigahertz (GHz) (mmWave) in frequency bands that are defined by one or more supported communication standards and/or radar sensing operations.

The metal structure 106 is disposed within a near-field radiation region of the mmWave antenna 104 and between the mmWave antenna 104 and a housing 208 of the device. The housing 208 (or a portion of which that is covering an area of the mmWave antenna 104 and the metal structure 106) is made of an RF translucent or RF transparent material. In other words, the housing 208 generally does not significantly affect the radiation patterns of the mmWave antenna 104 (e.g., minimally attenuates the radiation patterns). In some implementations, the metal structure 106 can be an integral part of the housing 208 (e.g., represents a portion of the housing). In other implementations, the metal structure 106 and the mmWave antenna 104 can be packaged together as part of an antenna module. The metal structure 106 reflects a portion of the near-field radiation region to affect a far-field radiation pattern of the mmWave antenna 104. In addition or alternatively, the near-field radiation region of the mmWave antenna 104 can cause a current to be induced in the metal structure 106 that causes the metal structure 106 to radiate another far-field radiation pattern that is constructive to the far-field radiation pattern that would be generated by the antenna in the absence of the metal structure. The near and far-field radiation patterns are further described with respect to FIG. 3.

Near and Far-Field Radiation Patterns

Figure 3:
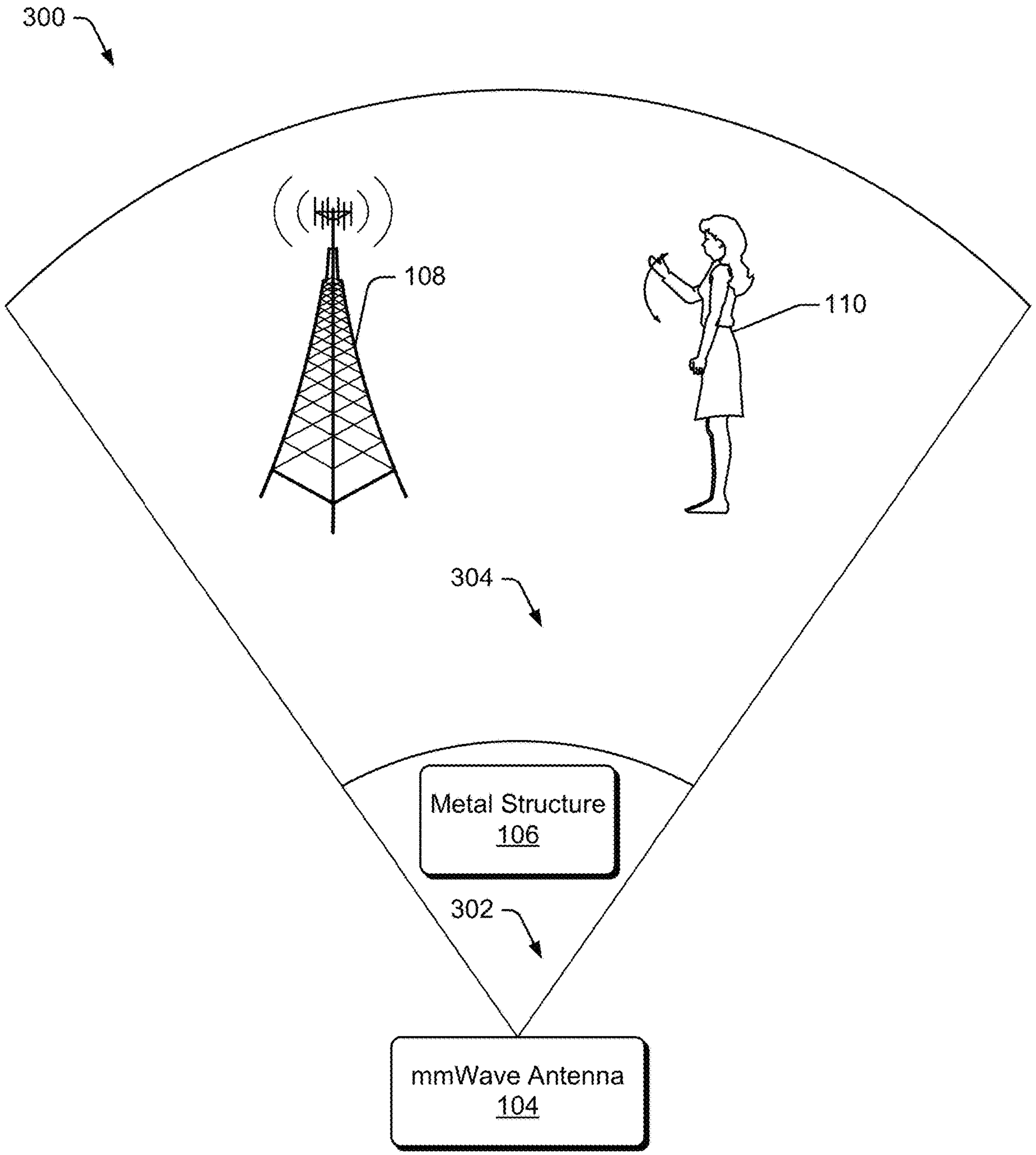
FIG. 3 illustrates example near-field and far-field radiation patterns of a mmWave antenna.

FIG. 3 illustrates, at 300, a near-field radiation region 302 and a far-field radiation pattern 304 of the mmWave antenna 104. A boundary between the near-field radiation region 302 and the far-field radiation pattern 304 is generally characterized by the Fraunhofer distance, which is dependent upon the frequencies transmitted by the mmWave antenna 104. In some example implementations, this boundary can be a few millimeters from the mmWave antenna 104 or less. For the purposes of this disclosure, the near-field radiation region 302 is generally within the user device 102, although it may extend past the housing 208 of the user device 102. The far-field radiation pattern 304 has an effective range that enables the user device 102 to wirelessly communicate with the base station 108 and/or recognize gestures performed by the user 110 through radar sensing. In FIG. 3, the near-field radiation region 302 and the far-field radiation pattern 304 are not drawn to scale for illustration simplicity and description purposes.

As shown in FIG. 3, the metal structure 106 is positioned within the near-field radiation region 302 of the mmWave antenna 104. Due to this position, the metal structure 106 interacts with the electric and magnetic fields within the near-field radiation region 302. This interaction can cause the metal structure 106 to reflect a portion of the near-field radiation in region 302, which can affect (e.g., influence or change) the far-field radiation pattern 304 of the mmWave antenna 104. In other words, the near-field radiation in region 302 of the mmWave antenna 104 can cause a current to be induced in the metal structure 106. This current causes the metal structure 106 to generate another far-field radiation pattern that is constructive to (e.g., adds constructively to) the far-field radiation pattern 304 to produce an overall far-field mmWave radiation pattern that is optimized compared to the far-field radiation pattern 304 without the metal structure 106.

By placing the metal structure 106 within the near-field radiation region 302 of the mmWave antenna 104, the metal structure 106 is able to improve signal coverage of the mmWave antenna 104 (e.g., by steering and/or broadening the far-field radiation pattern 304). With different configurations of the metal structure 106, the mmWave far-field radiation pattern can be manipulated without using expensive and complicated phased arrays. Configurations of the metal structure 106 are further described with respect to FIGS. 4-6.

Metal Structure Configurations

Figure 4:
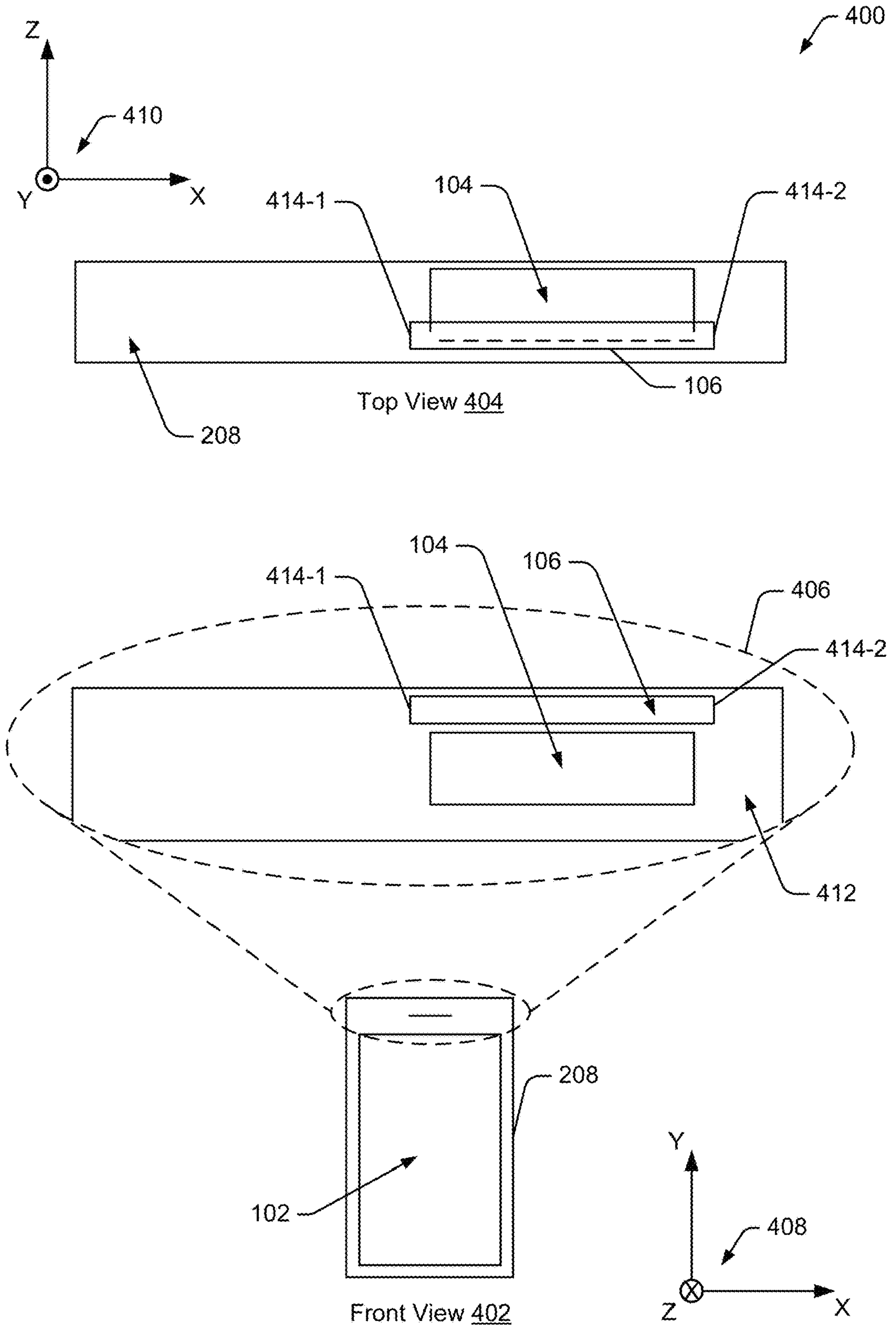
FIG. 4 illustrates an example implementation of a metal structure for steering and broadening mmWave antenna coverage.
Figure 5:
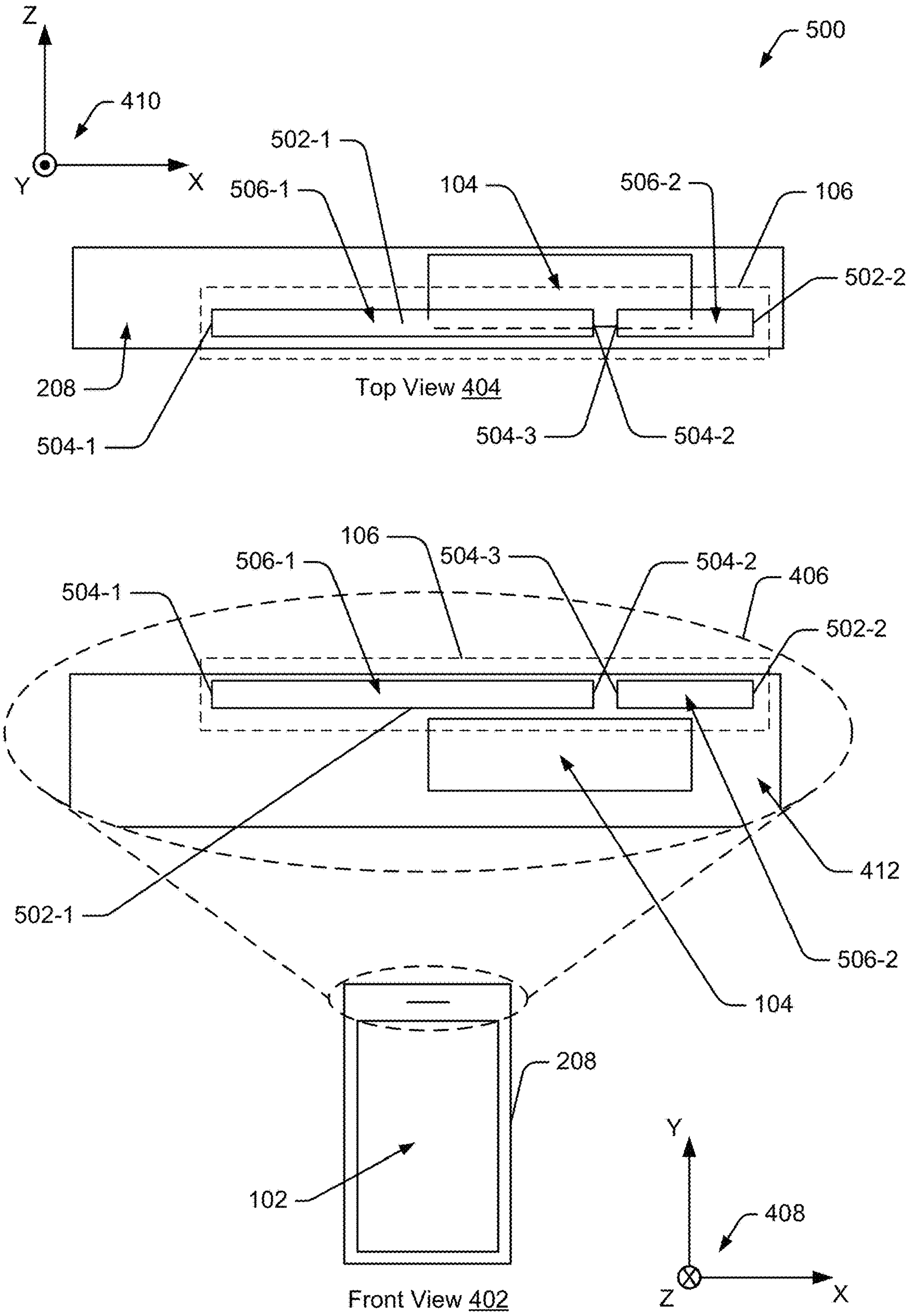
FIG. 5 illustrates another example implementation of a metal structure for steering and broadening mmWave antenna coverage.
Figure 6:
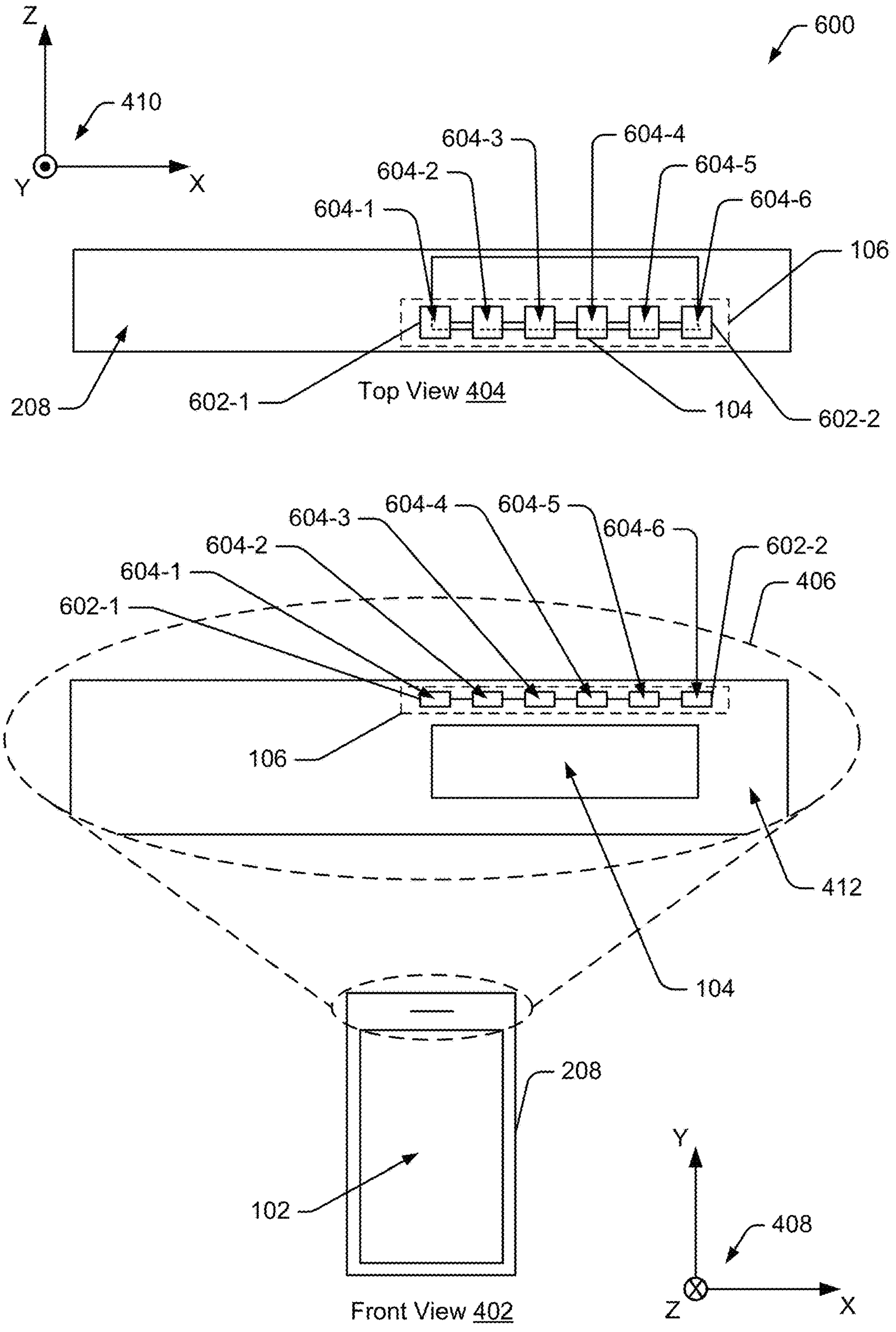
FIG. 6 illustrates yet another example implementation of a metal structure for steering and broadening mmWave antenna coverage.

FIGS. 4-6 show example implementations of the metal structure 106. The illustrated implementations 400, 500, and 600 contain a front view 402 and a top view 404 of the user device 102, along with a detail view 406 of a portion of the front view 402. The front view 402 illustrates the user device 102 along a Z axis that is normal (e.g., perpendicular) to an X-Y plane of a front view coordinate system 408. The top view 404 illustrates the user device 102 along the Y axis, which is normal to an X-Z plane of a top view coordinate system 410. The front view coordinate system 408 and the top view coordinate system 410 are rotations of a same global coordinate system. The X axis is generally a width axis, the Y axis is generally a height axis, and the Z axis is generally a thickness axis of the user device 102. The global coordinate system is arbitrary, however, and is merely provided to show/describe locations and configurations of the disclosed components.

The metal structure 106 is disposed between the mmWave antenna 104 and the housing 208 of the user device 102. More specifically, the mmWave antenna 104 and the metal structure 106 are disposed within a top bezel area 412 of the user device 102, as shown in the front view 402. In this location, the mmWave antenna radiates energy across the X-Z plane. The mmWave antenna 104 has a direction of maximum far-field energy, without beamforming, in a positive direction along the Y axis. The metal structure 106 is able to steer and/or broaden the far-field radiation pattern in a Y-Z plane, as described with respect to FIG. 7.

Although shown in the top bezel area 412, the mmWave antenna 104 and the metal structure 106 can be disposed together in another area of the user device 102 (e.g., on a side or bottom area of the user device 102) with a different direction of maximum far-field energy and possibly a different steering/broadening plane. Similarly, multiple instances of the mmWave antenna 104 and the metal structure 106 can be placed in respective areas of the user device 102 to improve mmWave antenna coverage in other directions and planes.

The metal structure 106 can be formed using one or more metal pieces. The metal pieces can be tuned (individually or collectively) to have certain electrical/electromagnetic attributes (e.g., resonant frequency, resistance, reflectivity, capacitance, or impedance). The tuning allows the metal pieces, when radiated upon by the near-field radiation of the mmWave antenna 104, to positively affect the far-field radiation pattern 304 of the mmWave antenna 104. In some implementations, one or more of the metal pieces may be electrically loaded. For example, one or more electrical components may be attached to one or more of the metal pieces to aid in tuning (e.g., resistor, capacitor, variable capacitor, inductor, or diode).

Although shown as bar-like structures, the metal pieces can be curved, have bends on the ends in the X-Z plane or the X-Y plane, have various cross-sections, or have varying cross-sections along their length to achieve the tuning. Furthermore, the metal pieces can be made of various conducting materials (e.g., metal, conductive plastic, conductive composite, non-metallic conductor, or semi-conductor). By configuring the electric characteristics, the shape, and the materials of the metal pieces, different effects on the far-field radiation pattern 304 of the mmWave antenna 104 can be achieved. For example, a peak amplitude, directivity, and/or shape of the far-field radiation pattern 304 may be affected.

In some implementations, at least a portion of the metal structure overlaps at least a portion of the mmWave antenna 104 when viewed along the Y axis (e.g., in the top view 404). For example, the metal pieces of the metal structure 106 can overlap the mmWave antenna 104 by less than 0.25 mm along the Z axis. The metal structure 106 can be any width (e.g., length along the X axis), although it is generally near a width of the mmWave antenna 104. In order to achieve coupling, the width of the metal structure 106 (as a whole, an individual metal piece, or electrically connected metal pieces) is generally above ¼ of a wavelength of the mmWave radiation (e.g., 3 mm to 50 mm). Different locations of the metal piece of the metal structure 106 along the Z axis can enable an amount and/or direction of the steering/broadening effect on the far-field radiation pattern 304 to be configured.

The metal pieces are generally separated from the mmWave antenna 104 along the Y axis (so as not to become part of the mmWave antenna 104 via direct electrical conduction). In some example implementations, a distance (e.g., separation) between the mmWave antenna 104 and the metal structure 106 along the Y axis can be less than a millimeter. Although the metal pieces are shown as being separated from the mmWave antenna 104 along the Y axis, portions of the metal pieces can overlap along the X and Y axes outside of an area of the mmWave antenna 104. For example, one or more of the metal pieces can have bends so that the metal piece extends along more than one face of the mmWave antenna 104 and/or extends in two or more planes.

Three example configurations of the metal structure 106 are described below.

FIG. 4 illustrates an example implementation 400 of the metal structure 106. In the example implementation 400, the metal structure 106 comprises a single metal piece that has grounded connections 414 at ends of the metal piece (e.g., 414-1 and 414-2).

Although shown as having a single metal piece, the metal structure 106 can alternatively have multiple instances of the metal piece disposed above the mmWave antenna 104 in order to steer the far-field radiation pattern 304 back and forth (e.g., via switching) in the X-Z plane or in another plane. For example, another metal piece may be implemented that is on an opposite side of the mmWave antenna 104 and parallel to the first metal piece. The metal piece shown in FIG. 4 steers/broadens the far-field radiation pattern 304 in a positive rotation about the X axis (as discussed with regard to FIG. 7) and implementing the other metal piece on the opposite side of the mmWave antenna 104 steers/broadens the far-field radiation pattern 304 in a negative rotation about the X axis. The switching may be effective to render one of the metal pieces electromagnetically transparent to the mmWave antenna 104 (e.g., by grounding, un-coupling, or otherwise adjusting electrical loading of one or more portions of the metal piece).

For implementations in which the mmWave antenna 104 implements a multi-dimensional antenna array, the metal structure 106 can for example be formed using four metal pieces positioned around the mmWave antenna 104 with two of the four metal pieces being disposed perpendicular to the first metal piece shown in FIG. 4 (the fourth metal piece being parallel to the first metal piece as discussed above). The metal pieces that are perpendicular to the depicted metal piece can steer/broaden the far-field radiation pattern 304 around the Z axis.

FIG. 5 illustrates another example implementation 500 of the metal structure 106. In the example implementation 500, the metal structure 106 comprises two metal pieces 506 (e.g., 506-1 and 506-2). Although the bounding box denoting the metal structure 106 is shown as extending outside the user device 102, the bounding box is for illustration only. As shown, the metal pieces 506 (e.g., 506-1 and 506-2) forming the metal structure 106 are disposed within the user device. Although they are shown as being different lengths, the metal pieces 506 can alternatively have similar sizes to one another. One of the metal pieces (e.g., 506-1) can have one of a plurality of grounded connections 502 in a middle of the piece (e.g., at 502-1) while another of the metal pieces (e.g., 506-2) can have another of the grounded connections 502 at an end of the piece (e.g., at 502-2). Open connections 504 (e.g., electrical opens) can be on each end of the metal pieces 506 that are not grounded (e.g., 504-1, 504-2, and 504-4). The open connections 504 may comprise open switches.

FIG. 6 illustrates yet another example implementation 600 of the metal structure 106. In the example implementation 600, the metal structure 106 comprises a plurality of metal pieces 604 (e.g., 604-1 through 604-6). Although they are shown as being similar sizes, the metal pieces 604 can alternatively be different sizes to one another. If they are different sizes, larger metal pieces can be configured anywhere within the length of the metal structure 106. Furthermore, although the metal pieces are shown as a one-dimensional array (e.g., arranged in a line), the metal pieces 604 can alternatively be configured in a non-linear one-dimensional array or a multi-dimensional array (e.g., a two-dimensional array or a three-dimensional array). For example, a two-dimensional array can comprise multiple linear or two-dimensional arrays distributed around the perimeter of the mmWave antenna 104 similar to the multiple metal piece structure described with respect to FIG. 4. As such, the two-dimensional array may not cover a center area of the mmWave antenna 104.

The metal structure 106 can have grounded connections 602 at ends of the metal structure 106 (e.g., at 602-1 and 602-2). Between each pair of the metal pieces 604 can be an electrical switch (e.g., micro-electro-mechanical systems (MEMS), diode, silicon-on-insulator (SOI), or complementary metal-oxide-semiconductor (CMOS)). The configuration of the metal structure can be varied by configuring the switches (e.g., by connecting a portion of the metal pieces 604 in series together and disconnecting another portion of the metal pieces 604 from the portion of connected metal pieces 604). Doing so enables various amounts of steering and/or broadening as well as direction of the far-field radiation pattern 304 of the mmWave antenna 104 to be achieved.

For example, when the metal pieces 604 are implemented in a one-dimensional linear array (e.g. as shown in FIG. 6), connecting different quantities of the metal pieces 604 together can achieve different amounts of steering and/or broadening of the far-field radiation pattern 304 in a positive rotation about the Y axis. For example, if all switches are closed, the metal prices are connected in series with one another between the grounded connections 602 at the ends of the metal structure 106. If, however, one or more switches are open, the metal structure is configured as two separate metal pieces or groups of series-connected metal pieces, each of which is connected to one of the grounded connections. Similarly, if there are three or more metal pieces and two or more of the switches are open, at least one of the metal pieces is isolated from the grounded connection (e.g., is not grounded although it could be grounded via one or more other switches). When implemented in a two-dimensional array, connecting different quantities of the metal pieces 604 in respective areas of the two-dimensional array together, grounding different metal pieces 604, and/or changing electrical loadings of the metal pieces 604 can enable various amounts of steering and broadening (positive and negative) as well as steering and broadening in another dimension (e.g., steer the far-field radiation pattern 304 towards the side of the user device 102 in a positive or negative rotation about the Z axis). The steering angle is discussed below with respect to FIG. 7.

As stated above, at least a portion of the metal pieces 604 overlap at least a portion of an area of the mmWave antenna 104 in the top view 404. For example, when implemented as a linear array, the metal pieces 604 can overlap the area of the mmWave antenna 104 by less than 0.25 mm along the Z axis. In another configuration where the linear array is shifted up along the Z axis, one or more of the metal pieces 604 can be within the area of the mmWave antenna 104. In yet another configuration where the metal pieces 604 are implemented as a two-dimensional array, some of the metal pieces 604 can be within the area of the mmWave antenna 104, and some of the metal pieces 604 can be only partially be within the area of the mmWave antenna 104.

By connecting different quantities of the metal pieces 604 together, various amounts of steering and/or broadening of the far-field radiation pattern 304 of the mmWave antenna 104 can be achieved. Furthermore, when the metal structure 106 is implemented as a two-dimensional array of metal pieces 604, steering and/or broadening of the far-field radiation pattern 304 of the mmWave antenna 104 can be achieved in multiple planes (e.g., X-Y plane in conjunction with X-Z plane of FIG. 7).

Example Steering and Broadening

Figure 7:
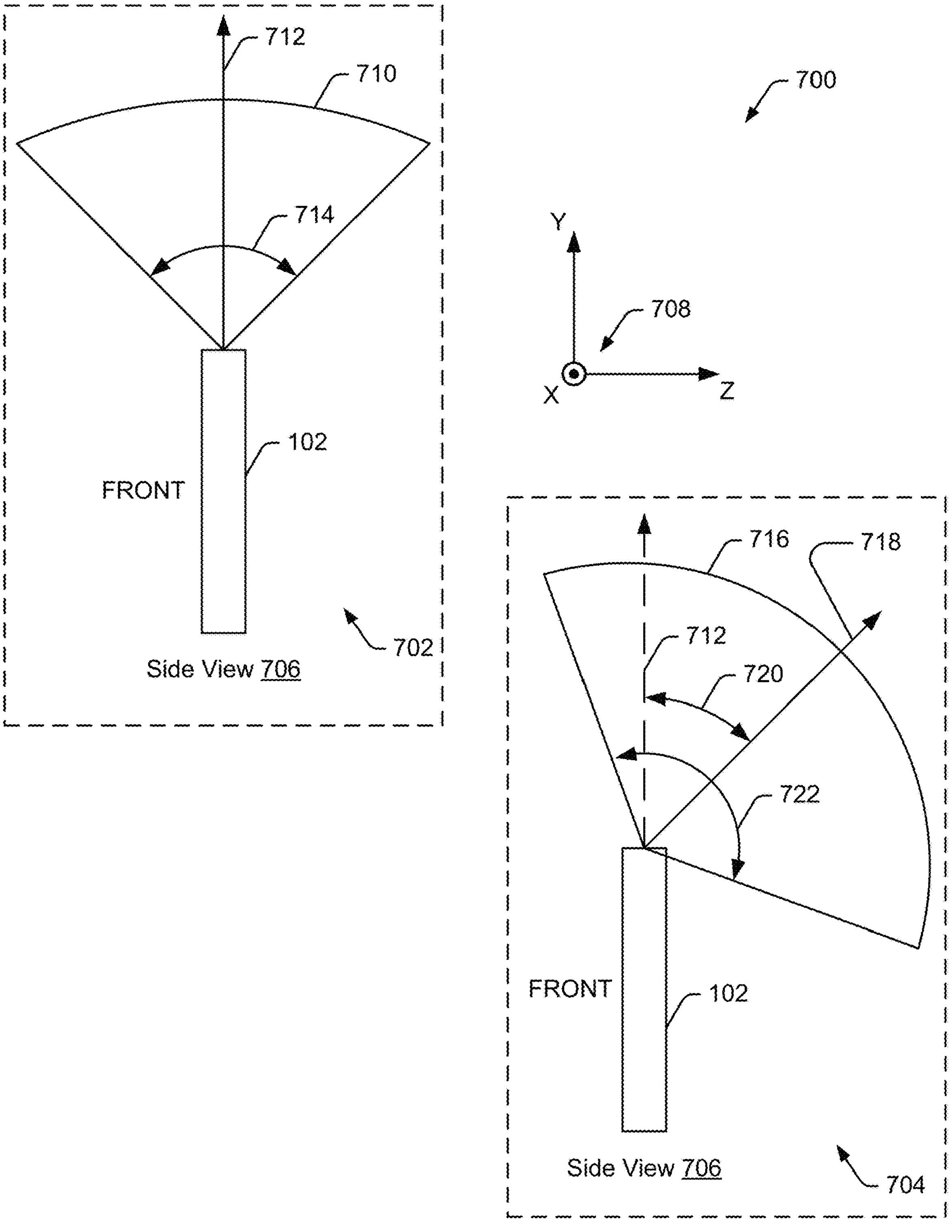
FIG. 7 illustrates an example effect of a metal structure steering and broadening mmWave antenna coverage.

FIG. 7 depicts an example illustration 700 of a steering and broadening effect on a far-field radiation pattern 304 of a mmWave antenna 104. The illustration 700 shows an illustration 702 without the metal structure 106 of FIGS. 1-6 disposed within the user device 102 and an illustration 704 with the metal structure 106 of FIGS. 1-6 disposed within the user device 102. The illustrations 702 and 704 both show the user device 102 as viewed along the X axis (e.g., side view 706) that is normal to a Z-Y plane of a side view coordinate system 708.

In the illustration 702, the mmWave antenna 104 is configured to, without beamforming (and without the metal structure 106), radiate an unimplemented far-field radiation pattern 710 with an unimplemented direction of maximum energy 712 that is generally in a same direction as the positive Y axis. The unimplemented far-field radiation pattern 710 also has an unimplemented angular coverage 714 that corresponds to a range of angles of the unimplemented far-field radiation pattern 710 that are above a threshold energy level.

In the illustration 704, the metal structure 106 is implemented, which causes a steering and/or broadening effect on the far-field radiation pattern 304. When implemented, the metal structure 106 causes the unimplemented far-field radiation pattern 710 to shift to an implemented far-field radiation pattern 716. The implemented far-field radiation pattern 716 has an implemented direction of maximum energy 718 that has been shifted by a steering angle 720 from the unimplemented direction of maximum energy 712. In this illustration, the steering angle 720 is positive (e.g., clockwise). If the metal structure 106 is placed elsewhere (e.g., along the Z axis) or through another configuration of the metal structure 106 (e.g., a different quantity of metal pieces 504 connected together), greater or lesser steering angles or negative steering angles can be achieved. It has been found that it is possible to steer the far-field radiation pattern by up to and at least 45°. The implemented far-field radiation pattern 716 also has an implemented angular coverage 722 that corresponds to a range of angles of the implemented far-field radiation pattern 716 that are above the threshold energy level. As illustrated, the implemented angular coverage 722 is broader compared to the unimplemented angular coverage 714 (e.g., the angular range is greater). As such, similar coverage (or better) to that of multiple antennas (or antenna arrays) on different sides of the user device 102 can be achieved with only a single antenna (or antenna array).

As discussed above, through configuration of the metal structure 106, various values of the steering angle 720 and broadening of the range of coverage (e.g., implemented angular coverage 722 vs. unimplemented angular coverage 714) can be achieved. As also discussed above, the illustrated example of steering and broadening is in a single plane for a single antenna (or antenna array). By configuring the metal pieces as a two-dimensional array, steering/broadening can be achieved in two orthogonal planes (e.g., X-Y plane in conjunction with Z-Y plane). Furthermore, by integrating similar other instances of the metal structure 106 with other antennas/arrays on other sides of the device, spherical signal coverage of the device can be improved.

Example Methods

The methods described below are shown as sets of operations (or acts) performed but not necessarily limited to the order or combinations in which the operations are described herein. Further, any of one or more of the operations can be repeated, combined, reorganized, or linked to provide a wide array of additional and/or alternate methods. In portions of the following discussion, reference can be made to components discussed with respect to FIGS. 1-7, reference to which is made for example only. The techniques are not limited to performance by one entity or multiple entities operating on one device.

Figure 8:
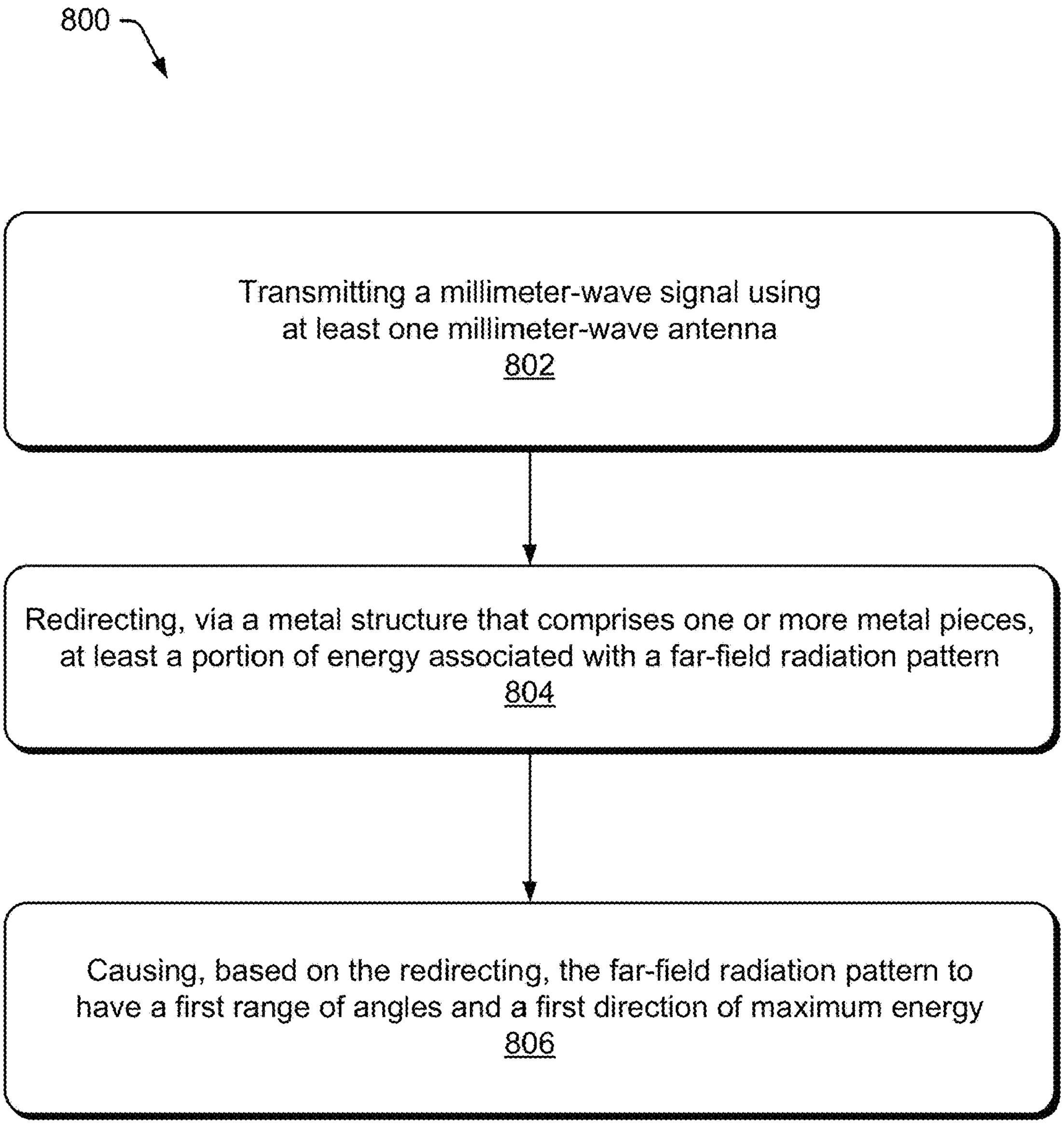
FIG. 8 illustrates an example method of using a metal structure for steering and broadening mmWave antenna coverage.

FIG. 8 depicts an example method 800 for steering and broadening mmWave antenna coverage.

At 802, a millimeter-wave signal is transmitted using at least one millimeter-wave antenna. The transmitted millimeter-wave signal forms a near-field radiation region and a far-field radiation pattern. For example, the mmWave antenna 104 transmits a mmWave signal, which forms the near-field radiation region 302 and the far-field radiation pattern 304 shown in FIG. 3. The mmWave signal can include a wireless communication signal used to form the wireless link 112 or a radar signal used to recognize the user 110's gestures, as shown in FIG. 1. The mmWave signal can include frequencies that are greater than or equal to 24 GHz (e.g., approximately 30 GHz or approximately 60 GHz).

At 804, at least a portion of energy associated with the far-field radiation pattern is redirected via a metal structure. The metal structure has one or more metal pieces that are within the near-field radiation region, and the metal structure is disposed between the millimeter-wave antenna and a housing. For example, the metal structure 106 redirects, based on the near-field radiation region 302, at least a portion of energy associated with the far-field radiation pattern 304. The metal structure 106 redirects the far-field radiation pattern due to radiation in the near-field radiation region 302 acting upon the metal structure 106 (e.g., generating a current within the metal structure 106). The metal structure 106 includes one or more metal pieces (e.g., metal pieces 506-1 and 506-2 of FIG. 5 or metal pieces 604-1 to 604-6 of FIG. 6) that are within the near-field radiation region 302. In some implementations, a distance between the metal structure 106 and the mmWave antenna 104 is a few millimeters or less (e.g., less than one millimeter). The metal structure 106 is disposed between the mmWave antenna 104 and the housing 208, as shown in FIGS. 4-6. In some cases, the metal structure 106 and the mmWave antenna 104 are disposed in the top bezel 312 area of the user device 102.

At 806, the far-field radiation pattern is caused, based on the redirecting, to have a first range of angles and a first direction of maximum energy. For example, the metal structure 106 causes the far-field radiation pattern 304 to have the implemented angular coverage 722 and the implemented direction of maximum energy 718, as shown in FIG. 7. The implemented angular coverage 722 and/or the implemented direction of maximum energy 718 increases the mmWave coverage area of the mmWave antenna 104 relative to other implementations that do not include the metal structure 106. In this way, the user device 102 can realize a particular amount of mmWave coverage using fewer mmWave antennas 104. Additionally, some implementations of the metal structure 106 enable the user device 102 to dynamically change the implemented angular coverage 722 and the direction of maximum energy 718, as further described below with respect to FIG. 9.

Figure 9:
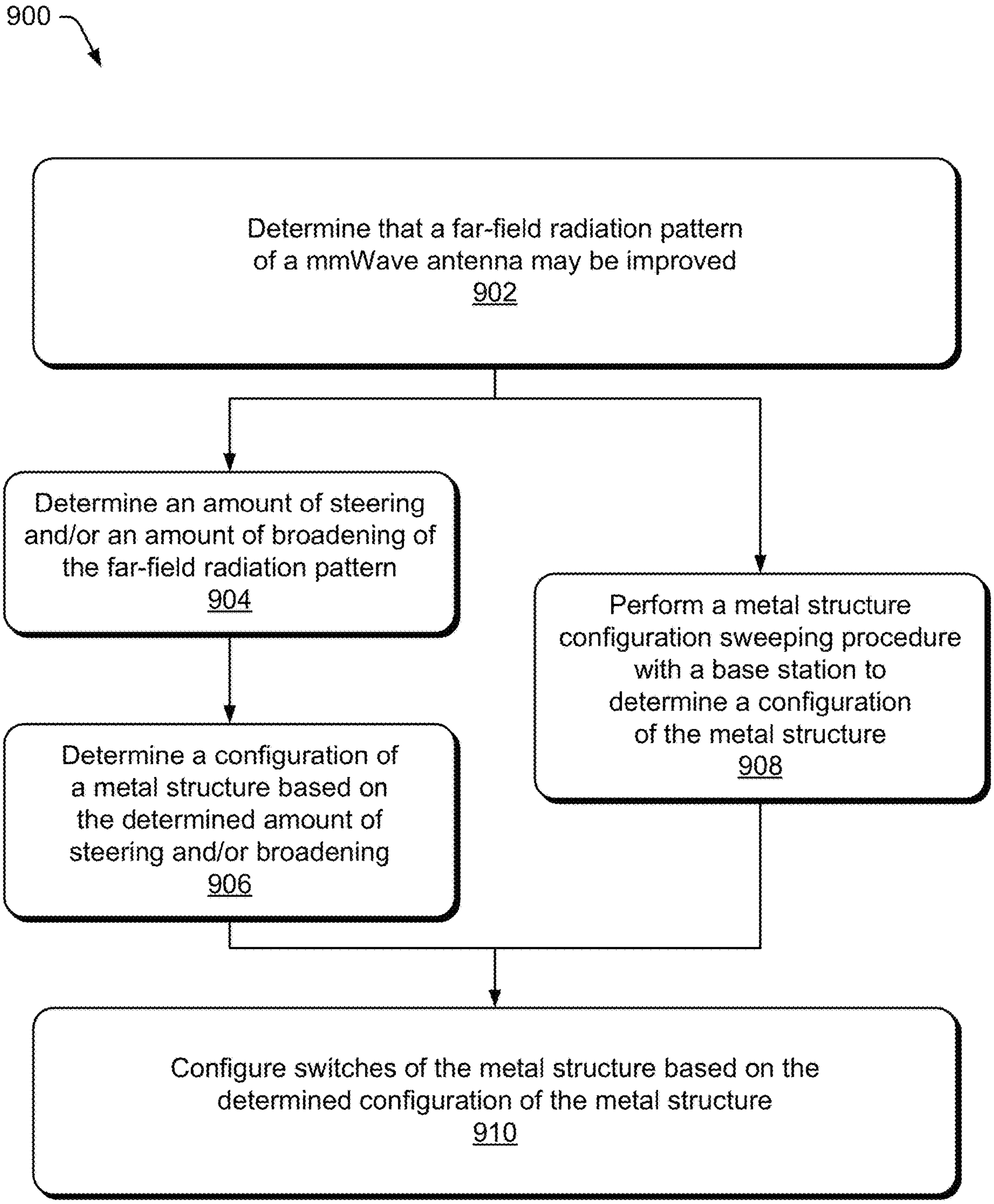
FIG. 9 illustrates an example method of configuring a metal structure for steering and broadening mmWave antenna coverage.

FIG. 9 depicts an example method 900 for configuring a metal structure 106 for steering and broadening mmWave antenna coverage.

At 902, a determination is made by a user device that a far-field radiation pattern of a mmWave antenna of the user device can be improved. For example, the user device (e.g., user device 102) can determine that a link (e.g., wireless link 112) quality has fallen below a threshold value or that packets are not being received by one or more base stations (e.g., base station 108). The user device 102 can also receive an indication from one or more of the base stations 108 that the far-field radiation pattern 304 can be improved.

At 904, a determination is made as to how the far-field radiation pattern can be improved. For example, an adjustment can be a broadening of the far-field radiation pattern (e.g., implemented angular coverage 622) or an amount of steering (e.g., steering angle 620), or a combination of both. The user device 102 can make the determination based on sensor data, such as a gyroscope, accelerometer, or global navigation satellite system (GNSS). For example, the user device 102 can determine an orientation of the user device 102 and determine the adjustment based on the orientation of the user device 102.

At 906, the user device, based on the determined adjustment, determines a configuration of a metal structure disposed between the mmWave antenna and a housing of the user device that can provide some or preferably all of the desired adjustment to the far-field radiation pattern. The metal structure can comprise a plurality of metal pieces that are interconnected via switches with one or more grounding paths. The switches are actuatable to connect different quantities of the metal pieces together. The user device 102 can use a lookup table of pre-set configurations of the switches corresponding to respective adjustments or can use one or more calculations to determine a configuration of the switches between the metal pieces.

Alternatively to 904 and 906, at 908, the user device can perform a metal structure configuration sweeping procedure with a base station. For example, the user device 102 can communicate with the base station 108 using a plurality of configurations of the metal pieces in sequence, such that an optimal configuration can be chosen. Based on feedback corresponding to each of the configurations, the user device can select one of the plurality of configurations that provides, or is closest to, the optimal configuration.

At 910, the metal structure is configured based on the determined configuration. The configuration comprises setting each of the switches between the plurality of metal pieces. As discussed above, the configuration can be one of a plurality of pre-set configurations or determined ad hoc each time the procedure is performed. Once the metal structure has been configured, the mmWave antenna may then be operated to provide the desired far-field mmWave pattern.

By configuring the metal structure 106 to effectively modify a far-field radiation pattern of the mmWave antenna, signal quality can be improved without relying on complicated and expensive phased antenna arrays.

Similarly, when used for radar sensing, the far-field radiation pattern 304 may be shifted or manipulated due to detected changes in the environment. For example, the far-field radiation pattern 304 can follow the user 110's movements (e.g., via steering) or a range of angles of the far-field radiation pattern 304 can be adjusted (e.g., via broadening or narrowing) based on a range to the user 110 in order to support gesture recognition and presence detection.

Example Computing System

Figure 10:
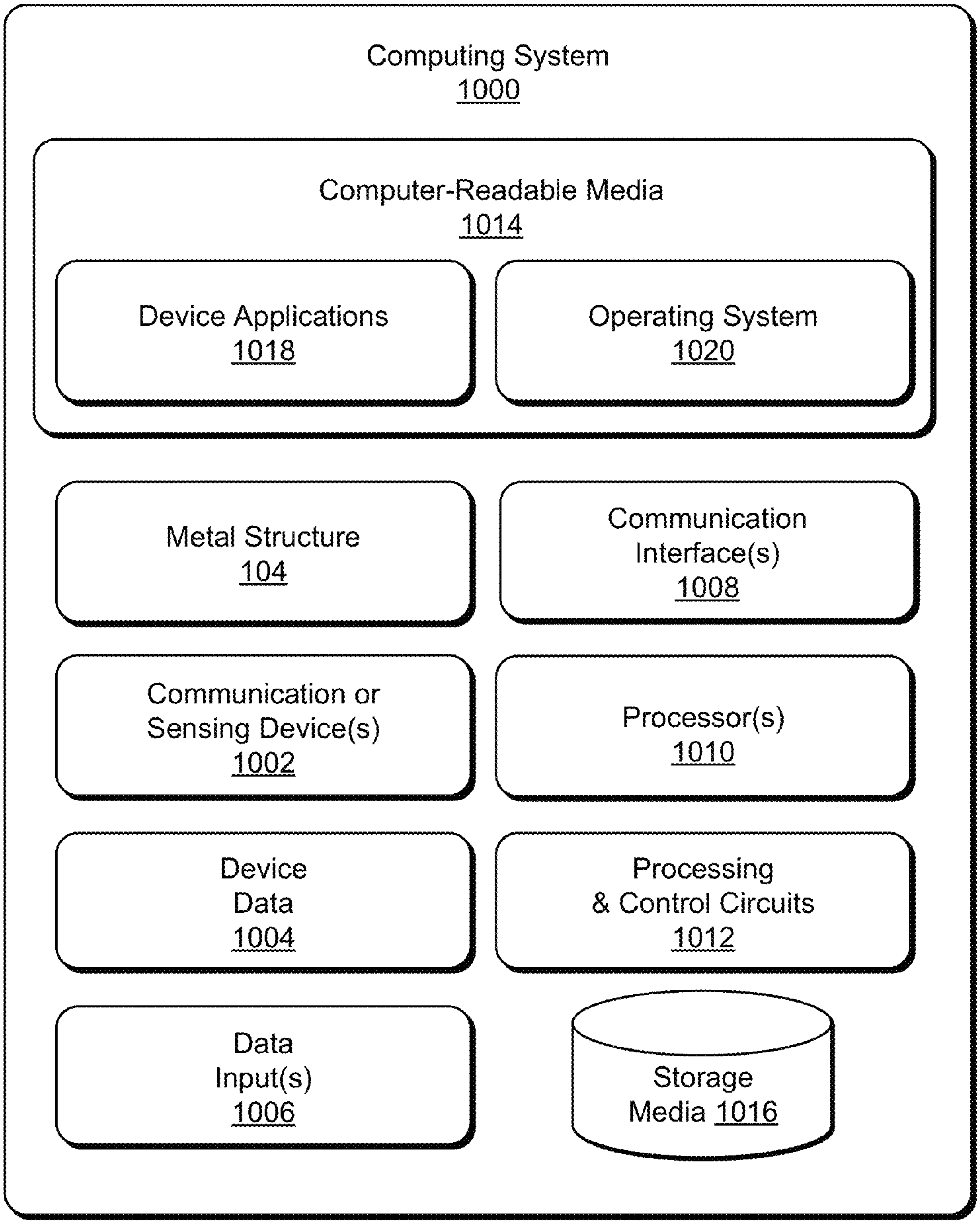
FIG. 10 illustrates an example computing system embodying, or in which techniques can be implemented that enable use of, a metal structure for steering and broadening mmWave antenna coverage.

FIG. 10 illustrates various components of an example computing system 1000 that can be implemented as any type of client, server, and/or computing device as described with reference to the previous FIG. 2 for wireless communication applications.

The computing system 1000 includes the metal structure 106 and one or more communication or sensing devices 1002 (e.g., mmWave antenna 104 and mmWave transceiver 206) that enable wireless communication of device data 1004 (e.g., received data, data that is being received, data scheduled for broadcast, or data packets of the data) or radar sensing. The device data 1004 or other device content can include configuration settings of the device, media content stored on the device, and/or information associated with a user of the device. Media content stored on the computing system 1000 can include any type of audio, video, and/or image data. In this case, the metal structure 106 helps facilitate transmission or reception of signals that carry at least a portion of the device data 1004 or are used for radar sensing. The computing system 1000 includes one or more data inputs 1006 that receive any type of data, media content, and/or inputs. Other types of data inputs 1006 include human utterances, user-selectable inputs (explicit or implicit), messages, music, television media content, recorded video content, user gestures, and any other type of audio, video, and/or image data received from any content and/or data source.

The computing system 1000 also includes one or more communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device can be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as device applications 1018 and any other types of information and/or data related to operational aspects of the computing system 1000. For example, an operating system 1020 can be maintained as a computer application with the computer-readable media 1014 and executed on the processors 1010. The device applications 1018 can include a device manager, such as any form of a control application, software application, signal-processing and control module, code that is native to a particular device, a hardware abstraction layer for a particular device, and so on. The device applications 1018 also include any system components, engines, or managers to enable wireless communication or radar-based applications (e.g., presence detection, gesture recognition, collision avoidance, or human vital-sign detection).

EXAMPLES

Example 1: An apparatus comprising: a housing; at least one millimeter-wave antenna configured to generate a near-field radiation region; and a metal structure: comprising one or more metal pieces; disposed between the millimeter-wave antenna and the housing; and disposed within the near-field radiation region.

Example 2: The apparatus of example 1, wherein the metal structure overlaps the millimeter-wave antenna in an x-z plane, the x-z plane being normal to a direction of maximum radiation of the millimeter-wave antenna.

Example 3: The apparatus of example 1 or 2, wherein the metal structure further comprises a single metal piece with a bar-like structure that is grounded on ends of the metal piece.

Example 4: The apparatus of example 1 or 2, wherein the metal structure further comprises a first metal piece that is grounded in a middle region and electrically open on ends of the first metal piece.

Example 5: The apparatus of example 4, wherein the metal structure further comprises a second metal piece: disposed proximate to an end of the first metal piece; oriented parallel to the first metal piece; open on an end proximate to the first metal piece; and grounded on another end.

Example 6: The apparatus of any preceding example, wherein the metal structure is electrically loaded via one or more electrical components.

Example 7: The apparatus of any preceding example, wherein the millimeter-wave antenna and the metal structure are disposed in a top bezel area of the apparatus.

Example 8: The apparatus of any preceding example, wherein the housing is configured to be substantially transparent to radio frequencies associated with a far-field radiation pattern of the millimeter-wave antenna.

Example 9: The apparatus of any preceding example, wherein: the millimeter-wave antenna is further configured to radiate energy in the far-field radiation pattern; and the metal structure is configured to act as a reflector that redirects at least a portion of the energy associated with the far-field radiation pattern.

Example 10: The apparatus of example 9, wherein the metal structure is configured to redirect the portion of the energy based on a current induced in the metal structure by the near-field radiation region.

Example 11: The apparatus of example 9 or 10, wherein the portion of the energy that is redirected broadens a range of angles associated with the far-field radiation pattern.

Example 12: The apparatus of any one of examples 9-11, wherein the portion of the energy that is redirected changes a direction of maximum energy of the far-field radiation pattern.

Example 13: The apparatus of any one of examples 1, 2, or 4-12, wherein the metal structure is reconfigurable. For example the metal structure may comprise: a plurality of metal pieces; and one or more electrical switches, each switch connected between a respective pair of the metal pieces and configured to selectively connect or disconnect the metal pieces of the pair to or from each other.

Example 14: The apparatus of example 13, wherein the metal pieces are arranged in a linear fashion.

Example 15: The apparatus of example 13 or 14, wherein: a first configuration of the electrical switches causes a first quantity of the metal pieces to be connected in series resulting in a first angle of maximum energy of the far-field radiation pattern; and a second configuration of the electrical switches causes a second quantity of the metal pieces to be connected in series resulting in a second angle of maximum energy of the far-field radiation pattern.

Example 16: The apparatus of any preceding example, wherein the apparatus comprises: a smartphone; a smart speaker; a smart thermostat; a smart watch; a gaming system; or a home appliance.

Example 17: The apparatus of any preceding example, wherein the apparatus further comprises a wireless communication or sensing device comprising the at least one millimeter-wave antenna.

Example 18: A method for steering and broadening millimeter-wave coverage, the method comprising: transmitting a millimeter-wave signal using at least one millimeter-wave antenna, the transmitting of the millimeter-wave signal forming a near-field radiation region and a far-field radiation pattern; redirecting, via a metal structure that comprises one or more metal pieces and based on the near-field radiation region, at least a portion of energy associated with the far-field radiation pattern, the metal structure disposed between the millimeter-wave antenna and a housing, the metal structure disposed within the near-field radiation region; and causing, based on the redirecting, the far-field radiation pattern to have a first range of angles and a first direction of maximum energy.

Example 19: The method of example 18, wherein the causing the first range of angles and the first direction of maximum energy is further based on at least one of: an estimated amount of steering of the far-field radiation pattern; or an estimated amount of broadening of the far-field radiation pattern.

Example 20: The method of example 18 or 19, wherein: the metal structure comprises a plurality of metal pieces connected by electrical switches; the redirecting of the far-field radiation pattern comprises connecting, prior to transmitting the millimeter-wave signal, a first quantity of the plurality of metal pieces via the electrical switches; and the method further comprises: connecting a second quantity of the plurality of metal pieces via the electrical switches; transmitting another millimeter-wave signal using the millimeter-wave antenna, the transmitting of the other millimeter-wave signal forming another near-field radiation region and another far-field radiation pattern; redirecting, via the metal structure and based on the other near-field radiation region, at least a portion of energy associated with the other far-field radiation pattern; and causing, based on the redirecting and the connecting of the second quantity of the plurality of metal pieces, the other far-field radiation pattern to have a second range of angles and a second direction of maximum energy, wherein at least one of the second range of angles is different than the first range of angles or the second direction of maximum energy is different than the first direction of maximum energy.

Example 21: A method implemented by a computing device, the method comprising: determining that a far-field radiation pattern of a mmWave antenna of the computing device can be improved; determining a configuration of a plurality of switches of a metal structure of the computing device that is disposed between the mmWave antenna of the computing device and a housing of the computing device; and configuring the switches based on the determined configuration effective to adjust the far-field radiation pattern of the mmWave antenna.

Example 22: The method of example 21, further comprising: performing a metal structure configuration sweeping procedure with one or more of the base stations, wherein the configuration is based on the metal structure configuration sweeping procedure.

Example 23: The method of example 21, further comprising: determining an amount of steering and/or an amount of broadening to be applied to the far-field radiation pattern, wherein the configuration is based on an amount of steering and/or broadening of the far-field radiation pattern.

Example 24: The method of any one of examples 21-23, wherein the configuration is further based on a lookup table comprising a plurality of pre-set configurations and associated amounts of steering and/or broadening.

CONCLUSION

Although techniques using, and apparatuses including a metal structure for steering and broadening mmWave antenna coverage have been described in language specific to features and/or methods, it is to be understood that the subject of the appended claims is not necessarily limited to the specific features or methods described. Rather, the specific features and methods are disclosed as example implementations of a metal structure for steering and broadening mmWave antenna coverage.

The invention claimed is:

1. An apparatus comprising:
- a housing;
- at least one millimeter-wave antenna configured to generate a near-field radiation region; and
- a metal structure:
  - comprising one or more metal pieces, the one or more metal pieces comprising a first metal piece that is grounded in a middle region and electrically open on ends of the first metal piece;
  - disposed between the millimeter-wave antenna and the housing; and
  - disposed within the near-field radiation region, wherein the metal structure overlaps the at least one millimeter-wave antenna in an x-z plane, the x-z plane being normal to a direction of maximum radiation of the millimeter-wave antenna.

2. The apparatus of claim 1, wherein the metal structure further comprises a single metal piece with a bar-like structure that is grounded on ends of the metal piece.

3. The apparatus of claim 1, wherein the one or more metal pieces further comprise a second metal piece:
- disposed proximate to an end of the first metal piece;
- oriented parallel to the first metal piece;
- open on an end proximate to the first metal piece; and
- grounded on another end.

4. The apparatus of claim 1, wherein the metal structure is electrically loaded via one or more electrical components.

5. The apparatus of claim 1, wherein the millimeter-wave antenna and the metal structure are disposed in a top bezel area of the apparatus.

6. The apparatus of claim 1, wherein the housing is configured to be substantially transparent to radio frequencies associated with a far-field radiation pattern of the millimeter-wave antenna.

7. The apparatus of claim 1, wherein:
- the millimeter-wave antenna is further configured to radiate energy in a far-field radiation pattern; and the metal structure is configured to act as a reflector that redirects at least a portion of the energy associated with the far-field radiation pattern.

8. The apparatus of claim 7, wherein the metal structure is configured to redirect the portion of the energy based on a current induced in the metal structure by the near-field radiation region.

9. The apparatus of claim 7, wherein the portion of the energy that is redirected broadens a range of angles associated with the far-field radiation pattern.

10. The apparatus of claim 7, wherein the portion of the energy that is redirected changes a direction of maximum energy of the far-field radiation pattern.

11. The apparatus of claim 1, wherein the metal structure comprises:

a plurality of metal pieces; and one or more electrical switches configured to selectively connect or disconnect each of the metal pieces to or from each other.

12. The apparatus of claim 11, wherein the metal pieces are arranged in a linear fashion.

13. The apparatus of claim 11, wherein:

a first configuration of the electrical switches causes a first quantity of the metal pieces to be connected in series resulting in a first angle of maximum energy of the far-field radiation pattern; and a second configuration of the electrical switches causes a second quantity of the metal pieces to be connected in series resulting in a second angle of maximum energy of the far-field radiation pattern.

14. The apparatus of claim 1, wherein the apparatus comprises:

a smartphone;

a smart speaker;

a smart thermostat;

a smart watch;

a gaming system; or a home appliance.

15. The apparatus of claim 1, wherein the apparatus further comprises a wireless communication or sensing device comprising the at least one millimeter-wave antenna.

16. A method for steering and broadening millimeter-wave coverage, the method comprising:

transmitting a millimeter-wave signal using at least one millimeter-wave antenna, the transmitting of the millimeter-wave signal forming a near-field radiation region and a far-field radiation pattern;

redirecting, via a metal structure that comprises one or more metal pieces, the one or more metal pieces comprising a first metal piece that is grounded in a middle region and electrically open on ends of the first metal piece, and based on the near-field radiation region, at least a portion of energy associated with the far-field radiation pattern, the metal structure disposed between the millimeter-wave antenna and a housing, the metal structure disposed within the near-field radiation region, wherein the metal structure overlaps the at least one millimeter-wave antenna in an x-z plane, the x-z plane being normal to a direction of maximum radiation of the millimeter-wave antenna; and causing, based on the redirecting, the far-field radiation pattern to have a first range of angles and a first direction of maximum energy.

17. The method of claim 16, wherein the causing the first range of angles and the first direction of maximum energy is further based on at least one of:

an estimated amount of steering of the far-field radiation pattern; or an estimated amount of broadening of the far-field radiation pattern.

18. The method of claim 16, wherein:

the metal structure comprises a plurality of metal pieces connected by electrical switches;

the redirecting of the far-field radiation pattern comprises connecting, prior to transmitting the millimeter-wave signal, a first quantity of the plurality of metal pieces via the electrical switches; and the method further comprises:

connecting a second quantity of the plurality of metal pieces via the electrical switches;

transmitting another millimeter-wave signal using the millimeter-wave antenna, the transmitting of the other millimeter-wave signal forming another near-field radiation region and another far-field radiation pattern;

redirecting, via the metal structure and based on the other near-field radiation region, at least a portion of energy associated with the other far-field radiation pattern; and causing, based on the redirecting and the connecting of the second quantity of the plurality of metal pieces, the other far-field radiation pattern to have a second range of angles and a second direction of maximum energy, wherein at least one of the second range of angles is different than the first range of angles or the second direction of maximum energy is different than the first direction of maximum energy.

19. The method of claim 16, wherein the metal structure is configured to redirect the portion of the energy based on a current induced in the metal structure by the near-field radiation region.

20. The method of claim 16, further comprising:

radiating, by the millimeter-wave antenna, energy in a far-field radiation pattern; and reflecting, by the metal structure, at least a portion of the energy associated with the far-field radiation pattern.

* * * * *